Dec. 4, 1928.
W. N. MESSIMER
1,694,333
JOURNAL LENGTH GAUGE
Filed Dec. 23, 1927
2 Sheets-Sheet 1
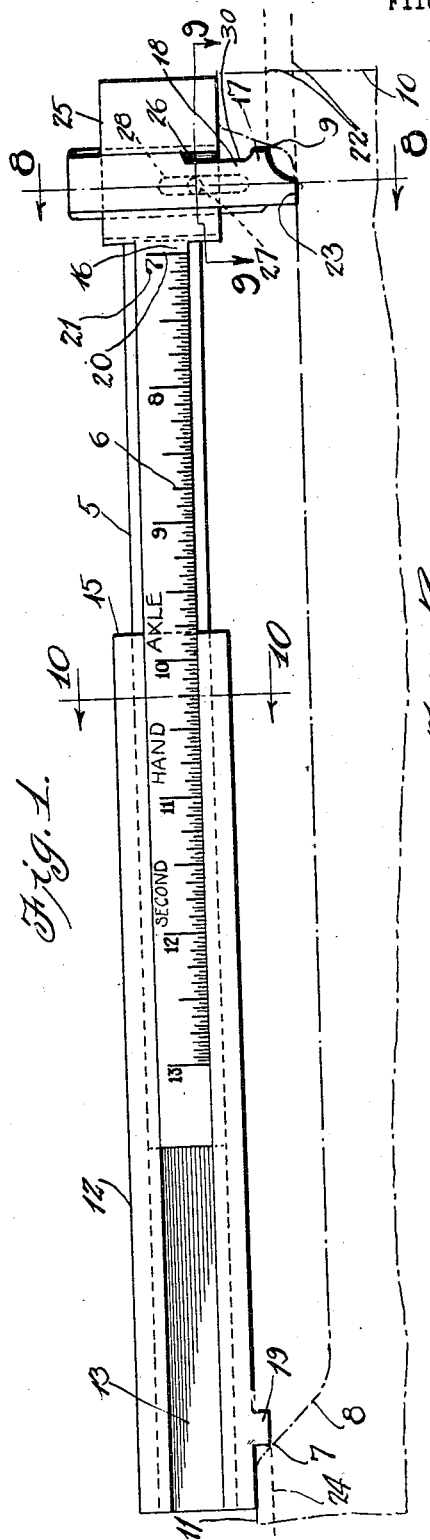
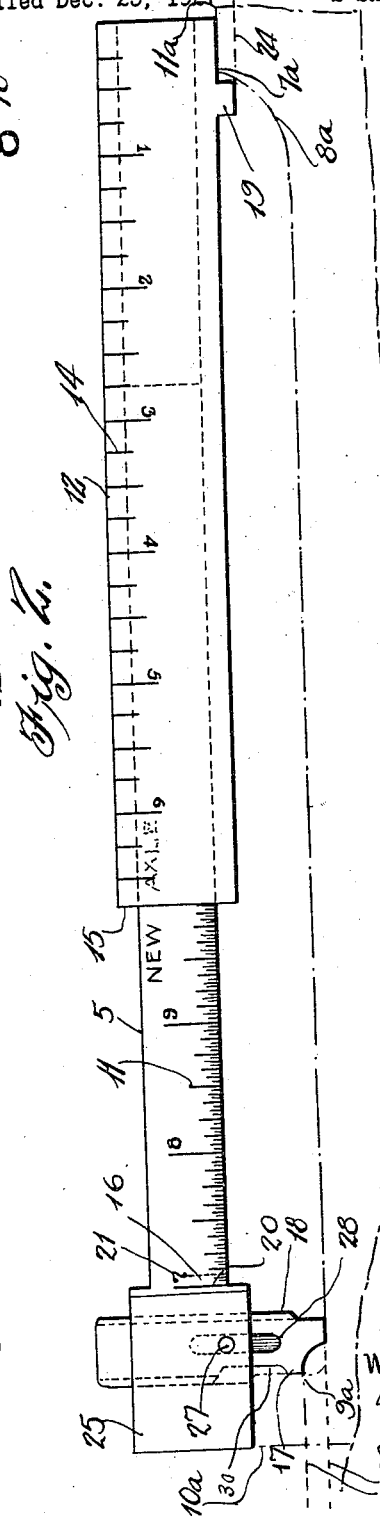
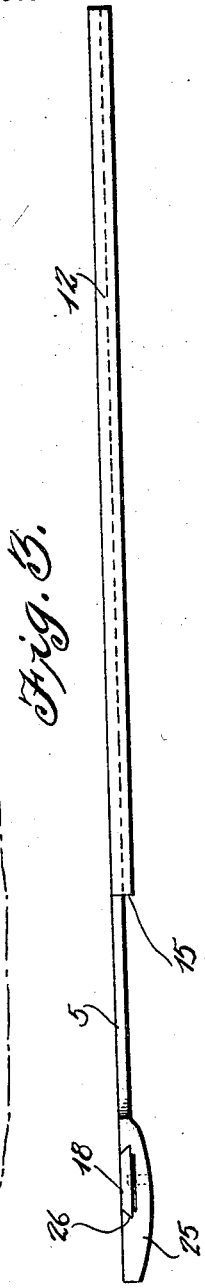
INVENTOR.
Ward N. Messimer.
by
ATTORNEY.

Dec. 4, 1928.                W. N. MESSIMER                1,694,333
                            JOURNAL LENGTH GAUGE
                            Filed Dec. 23, 1927           2 Sheets-Sheet 2
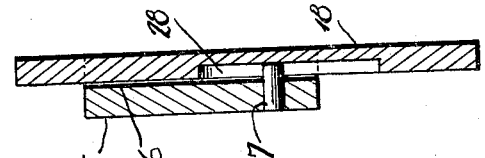
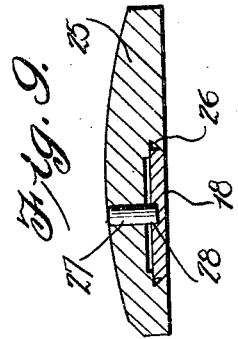
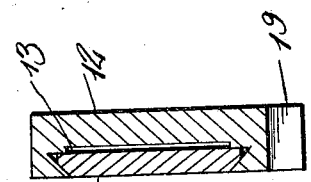
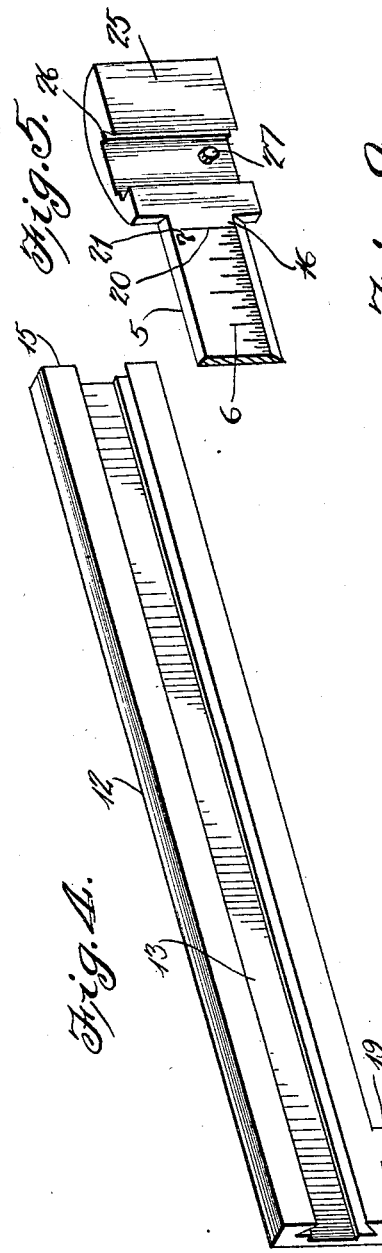
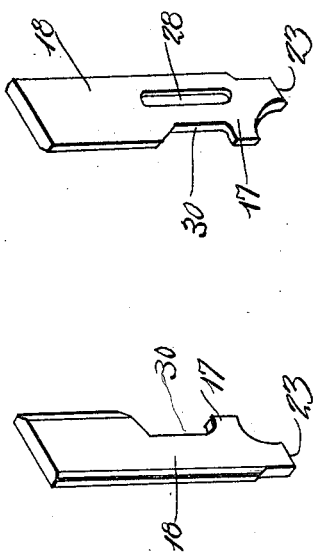
INVENTOR.
Ward N. Messimer.
BY
ATTORNEY.

Patented Dec. 4, 1928.

1,694,333

UNITED STATES PATENT OFFICE.

WARD N. MESSIMER, OF JERSEY SHORE, PENNSYLVANIA.

JOURNAL-LENGTH GAUGE.

Application filed December 23, 1927. Serial No. 242,164.

This invention relates to gauges for railway car axles, and has particular reference to an improved gauge for use in measuring the length of the journals of such axles.

The American Railway Association wheel committee have defined the points of a second hand railway car axle between which measurements will be taken to determine the length of the journal and the accounting for axles between the various railroad members of the A. R. A. will be handled on the measurements so taken.

The A. R. A. wheel committee have illustrated a gauge for taking the journal length dimension, but due to the variations in sizes of axles and to the different amount of wear found on second hand journals, the A. R. A. gauge cannot always measure between the points defined.

The primary object of the present invention, therefore, is to provide a gauge which is adjustable to suit any size of A. R. A. axle and any condition of wear within the condemning limits adopted by the A. R. A.

Other objects and advantages of the invention will become apparent as the nature of the same is better understood, and the invention consists in the novel form, combination and arrangement of parts hereinafter more fully described, shown in the accompanying drawings and claimed.

In the drawings, wherein like reference characters indicate corresponding parts throughout the several views.

Figure 1 is an elevational view of a journal length gauge constructed in accordance with the present invention, and illustrating its use in measuring the length of the journal of a second hand or worn railway car axle;

Figure 2 is a view similar to Figure 1 showing the device in use for measuring the journal length of a new railway car axle;

Figure 3 is a top plan view of the device shown in Figure 2;

Figure 4 is a perspective view of the outer slide forming part of the gauge shown in Figures 1 to 3 inclusive;

Figure 5 is a fragmentary perspective view showing an end portion of the inner slide of the gauge with the sliding contact finger removed;

Figure 6 is a perspective view of the sliding contact finger, looking at one side thereof;

Figure 7 is a view similar to Figure 6, looking at the other side of the contact finger;

Figure 8 is an enlarged vertical section taken on line 8—8 of Figure 1;

Figure 9 is an enlarged horizontal section taken on line 9—9 of Figure 1; and

Figure 10 is an enlarged transverse vertical section taken upon line 10—10 of Figure 1.

Referring more in detail to the drawings, the present gauge consists of a device of the slide rule type having three main members consisting of an inner slide 5 which is graduated as at 6 to give direct reading of journal length dimensions between the point 7 on the journal fillet 8 and the point 9 on the journal collar 10, as defined by the A. R. A. wheel committee, for second hand axles. The inner slide 5 is also graduated on the reverse side as at 11 to give direct reading of journal length dimensions between the inside of the journal collar $10^a$ and the point of intersection of the journal fillet $8^a$ and top of the dust guard collar $11^a$ of new axles, as indicated at $7^a$, the point of gauge contact on the inside of the journal collar being indicated at $9^a$.

The gauge further includes an outer slide 12 having a longitudinal undercut groove 13 in one side thereof within which the correspondingly shaped inner slide 5 is slidably fitted, whereby the gauge may be extended to the required length. The back of the outer slide 12 is graduated as at 14 to provide a convenient scale to be used with outside calipers in determining journal diameters.

The inner end edge 15 of the outer slide 12 forms an indicator opposite which the readings are taken directly from the scale of the inner slide 5, and the readings so indicated are substantially the actual dimensions from point $7^a$ to point $9^a$ on the new axle journal as read on the scale 11 of the slide 5. In a like manner, the readings indicated opposite the edge 15 of slide 12 by the graduations at 6 on the slide 5 are the actual dimensions from the point 7 to the point 9 on the journal of a second hand or used axle, the graduations 6 being so located with respect to graduations 11 on the inner slide 5 as to compensate as indicated at 16, for the difference between the point 7 on second hand or worn axles and the point of intersection 7ª of the journal fillet radius with the top of the dust guard collar on new axles. In other words, the graduations 11 of slide 5 being a given distance inwardly of the lateral contact lug 17 of sliding contact finger 18, while the graduations 6 begin a slightly greater distance inwardly of said contact lug 17 as indicated at 16. This compensates for the difference between the location of the points 7 and 7ª respectively on second hand and new axles.

The direct reading of the scales 6 and 11 at the end edge 15 of outer slide 12 is provided for by making the outer slide 12 of a given length between the contact lug 19 on the lower edge of the outer slide 12 and the inner end 15 of the slide 12. The initial graduations 20 of the scales 6 and 11 are given a 7 inch measurement indication as at 21. As the graduations 6 progress inwardly in regular order, the graduation disposed opposite or in line with the edge 15 will obviously indicate the combined distances between the contact point of lug 19 and the edge 15 and between the contact point of lug 17 and the edge 15, or the exact distance between the points of contact of the lugs 19 and 17 with the second hand car journal. Likewise, as the graduations 11 progress inwardly in regular order, the graduation disposed opposite or in line with the edge 15 will obviously indicate the combined distances between the point 7ª (intersection of the journal fillet radius and the top of dust guard collar) and the edge 15 and between the contact point of lug 17 and the edge 15. The contact lug 19 and contact finger 18 are located inwardly of the outer ends of the slides 5 and 12 so that the latter may rest at their ends with their lower edges engaged and disposed upon the dust guard collar 11 or 11ª and journal collar 10 or 10ª, respectively, of the axle.

The point 9 at which the lug 17 is adapted to engage the inner side of the journal collar 10 or 10ª is a given distance above or outwardly of the cylindrical surface of the journal between the journal collar and the dust guard collar, as indicated by the dotted lines at 22, and for this reason the lower outer corner of the contact lug 17 is located a corresponding distance from the lower or outer end edge 23 of the sliding contact finger 18 which is adapted to engage the cylindrical surface as shown clearly in Figures 1 and 2. In a like manner, the point at which the outer lower corner of the contact lug 19 is adapted to engage the journal fillet is a predetermined distance inwardly of the periphery or below the top of the dust guard collar 11 or 11ª as indicated by the dotted line 24, and for this reason the lug 19 is made of a corresponding predetermined length or projects a corresponding distance from the lower edge of the outer slide 12 for properly engaging this point on the fillet when the lower edge of the outer slide 12 is disposed to rest on the top of the dust guard collar as shown. The sliding contact finger 18 is adjustable vertically, or transversely of the slide 5, so that the lower end of the finger at 23 may be engaged with the cylindrical journal portion inwardly of the journal collar when the lower edge of the slide 5 is disposed upon the top of the journal collar, irrespective of the journal collar height which varies in different sizes of axles and axles whose journal bearing surfaces are worn to different degrees. However, by reason of the relation of the contact lug 17 to the end edge 23, the contact point of said lug 17 will always engage the journal collar at the prescribed point or distance above the cylindrical bearing surface of the journal. The outer end of the slide 5 is formed with an enlarged portion or head 25 having a transverse or vertical groove of undercut form in one side or face thereof as indicated at 26, and the finger 18 is shaped to slidably fit within this groove so as to be prevented from lateral displacement out of the same as clearly shown. In the preferred construction the groove and slide are preferably of dove-tail form as illustrated, and longitudinal displacement of the finger entirely out of the groove or detachment of the finger from the slide 5 is prevented to avoid loss, by means of a dowel pin 27 fixed to the slide 5 and projecting outwardly in the groove 26 to engage in a longitudinal elongated slot or groove 26 provided in the inner face of the finger 18 as shown clearly in Figures 2 and 8. The dowel pin 27 loosely engages in the slot 28 so as to permit the finger 18 to move freely in the slot 26.

The outer edge of sliding contact finger 18 is cut away as shown at 30 to provide clearance for any projecting parts of the journal collar 10 that may have resulted from irregularity of wear on the inside thereof and which might otherwise prevent lug 17 from bearing on journal collar 10 at point 9.

When measuring a journal for length by means of the present gauge, the sliding contact finger 18 is arranged so that the lower end thereof bears upon the cylindrical journal bearing surface at the inner side of the journal collar, with the lateral contact lug 17 engaged with the inner side of said journal collar as shown clearly in Figures 1 and 2, the lower edge of the slide 5 outwardly of the finger 18 being disposed against the periphery or upon the top of the journal collar. The slide 12 is then extended so that the lower edge thereof outwardly of the contact lug 19 may rest upon the top or against the periphery of the dust guard collar with the contact lug 19 engaging the fillet 8 or 8ª.

With the gauge so placed the dimension indicated by the graduation on the scale 6 or 11 aligned with the end edge 15, will be the length of the axle journal between the points 7 and 9 or 7ª and 9ª defined by the A. R. A. wheel committee for second hand or new axles, as the case may be.

From the foregoing description it is believed that the construction and operation as well as the advantages of the present invention will be readily appreciated by those skilled in the art.

Minor changes may be made without departing from the spirit and scope of the invention as claimed.

What I claim as new is:—

1. A journal length gauge for axles comprising an extensible rule composed of a pair of slidably connected members adapted to be engaged at their outer ends against the journal and dust guard collars of the axle, a contact member on one member of the rule adjacent but inwardly of the outer end of the latter, said contact member being of a predetermined length to engage the journal fillet at a predetermined point inwardly of the periphery of the dust guard collar, and a contact finger adjustable transversely of the other member of the rule and mounted adjacent but inwardly of the outer end thereof, said contact finger being adapted to be engaged at one end with the journal bearing surface and having a lateral contact member at a predetermined distance from its said end to engage the inner side of the journal collar at a point a given distance outwardly of said journal bearing surface, one of said rule members being graduated to coact with the inner end of the other rule member for indicating the distance between the points on the journal collar and the journal fillet of a new axle engaged by said contact members.

2. A journal length gauge for axles comprising an extensible rule having contacts adjacent but inwardly of the ends thereof, one of said contacts being adapted to engage the journal fillet at a predetermined point below the top of the dust guard collar of the axle when the adjacent end of the rule is disposed against said top of the dust guard collar, the other contact being adjustable transversely of the rule for engaging the journal bearing surfaces of axles having journal collars of different depths, a lateral contact member on the last named contact disposed to engage the inner side of the journal collar at a predetermined point above the journal bearing surface when the last named contact is engaged with the latter surface, and a head on one end of the rule having an undercut groove in one side thereof, said other contact embodying a finger slidably fitted in said groove.

3. A journal length gauge for axles comprising an extensible rule having contacts adjacent but inwardly of the ends thereof, one of said contacts being adapted to engage the journal fillet at a predetermined point below the top of the dust guard collar of the axle when the adjacent end of the rule is disposed against said top of the dust guard collar, the other contact being adjustable transversely of the rule for engaging the journal bearing surfaces of axles having journal collars of different depths, a lateral contact member on the last named contact disposed to engage the inner side of the journal collar at a predetermined point above the journal bearing surface when the last named contact is engaged with the latter surface, a head on one end of the rule having an undercut groove in one side thereof, said other contact embodying a finger slidably fitted in said groove, and means to limit the movement of said finger.

4. A journal length gauge for axles comprising an extensible rule having contacts adjacent but inwardly of the ends thereof, one of said contacts being adapted to engage the journal fillet at a predetermined point below the top of the dust guard collar of the axle when the adjacent end of the rule is disposed against said top of the dust guard collar, the other contact being adjustable transversely of the rule for engaging the journal bearing surfaces of axles having journal collars of different depths, a lateral contact member on the last named contact disposed to engage the inner side of the journal collar at a predetermined point above the journal bearing surface when the last named contact is engaged with the latter surface, a head on one end of the rule having an undercut groove in one side thereof, said other contact embodying a finger slidably fitted in said groove, said finger having a longitudinal elongated groove in the inner side thereof, and a pin carried by the head projecting into said elongated groove to allow free limited adjustment of the finger and prevent displacement of the latter out of the groove in the head.

5. A journal length gauge for axles comprising an extensible rule composed of a pair of slidably connected members adapted to be engaged at their outer ends against the journal and dust guard collars of the axle, a contact member on one member of the rule adjacent but inwardly of the outer end of the latter, said contact member being of a predetermined length to engage the journal fillet at a predetermined point inwardly of the periphery of the dust guard collar, and a contact finger adjustable transversely of the other member of the rule and mounted adjacent but inwardly of the outer end thereof, said contact finger being adapted to be engaged at one end with the journal bearing surface and having a lateral contact member at a predetermined distance from its said end to engage the inner side of the journal collar at a point a given distance outwardly of said journal bearing surface, one of said rule members being graduated to coact with the inner end of the other rule member for indicating the distance between the points on the journal collar and the journal fillet of a new axle engaged by said contact members, said one rule member being further graduated to coact with the inner end of the other rule member for indicating slightly less than the distance between the aforesaid points of a second hand axle.

In testimony whereof I affix my signature.

WARD N. MESSIMER.